(12) United States Patent
Carlos et al.

(10) Patent No.: US 6,169,244 B1
(45) Date of Patent: Jan. 2, 2001

(54) THERMOCOUPLE SHEATH COVER

(75) Inventors: Thomas F. Carlos, San Jose; Gary M. Moore, Los Gatos, both of CA (US)

(73) Assignee: Moore Epitaxial, Inc., San Jose, CA (US)

(*) Notice: Under 35 U.S.C. 154(b), the term of this patent shall be extended for 0 days.

(21) Appl. No.: 09/316,933

(22) Filed: May 21, 1999

(51) Int. Cl.[7] .................................................. H01L 35/32
(52) U.S. Cl. ...................... 136/201; 136/230; 374/208; 118/715
(58) Field of Search .................................... 136/201, 230; 374/208, 209; 118/712, 715, 724, 725; 117/86, 900

(56) References Cited

U.S. PATENT DOCUMENTS

| | | | |
|---|---|---|---|
| 4,978,567 | * 12/1990 | Miller | 428/157 |
| 5,053,247 | 10/1991 | Moore | 427/55 |
| 5,207,835 | 5/1993 | Moore | 118/725 |
| 5,444,217 | 8/1995 | Moore et al. | 219/405 |
| 5,580,388 | 12/1996 | Moore | 118/728 |
| 5,710,407 | 1/1998 | Moore et al. | 219/405 |
| 5,802,099 | 9/1998 | Curran et al. | 374/131 |
| 5,820,686 | 10/1998 | Moore | 118/730 |
| 5,872,632 | 2/1999 | Moore | 356/381 |

FOREIGN PATENT DOCUMENTS

WO 99/23276 * 5/1999 (WO).

* cited by examiner

*Primary Examiner*—Kathryn Gorgos
*Assistant Examiner*—Thomas H Parsons
(74) *Attorney, Agent, or Firm*—Serge J. Hodgson; Gunnison, McKay & Hodgson, L.L.P.

(57) ABSTRACT

A sheath cover for a quartz thermocouple sheath has an outer surface which includes silicon carbide. The silicon carbide has a greater adherence to deposits than quartz. The cover thus essentially eliminates deposit flaking and avoids the particulate contamination associated with conventional quartz thermocouple sheaths. The cover includes first and second half sections and a slip ring. The cover is easily installed over the sheath by placing the half sections around the sheath and then sliding the slip ring into place around the half sections.

28 Claims, 6 Drawing Sheets

THERMOCOUPLE SHEATH COVER

BACKGROUND OF THE INVENTION

1. Field of the Invention

This invention relates generally to semiconductor process equipment, and more particularly, to a thermocouple sheath cover suitable for use in a semiconductor reactor.

2. Description of the Related Art

Semiconductor processing typically involves the formation of one or more layers on a semiconductor substrate. For example, silicon epitaxy, sometimes called epi, is a process in which one or more layers of single-crystal (monocrystalline) silicon are deposited on a monocrystalline silicon wafer.

Figure 1:
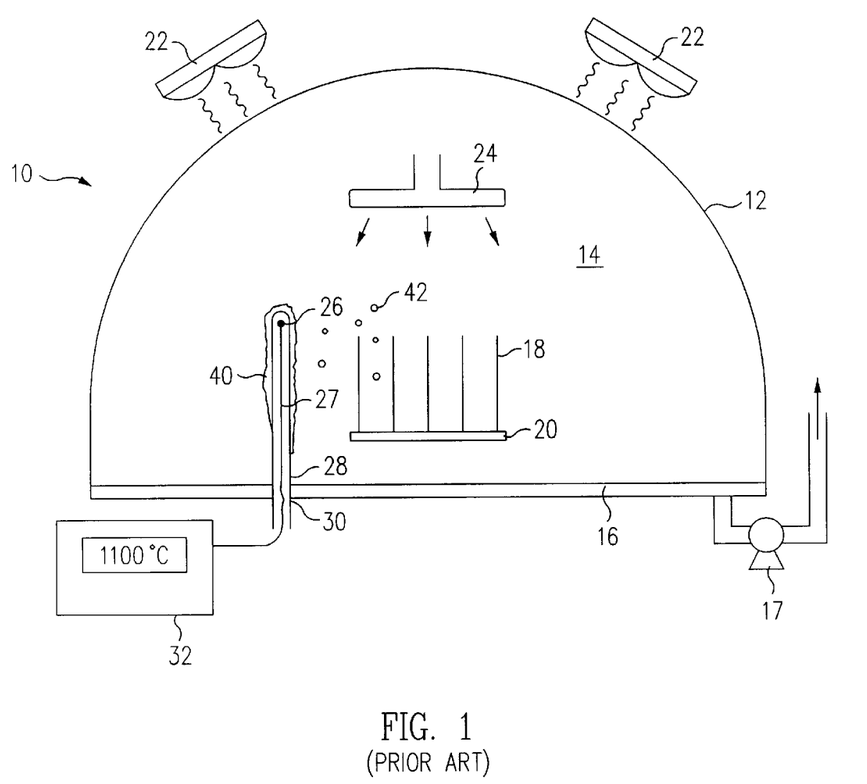
FIG. 1 is a schematic representation of an epi reactor which illustrates the accumulation of undesirable deposits on a thermocouple sheath in accordance with the prior art.

Unavoidably, these deposited layers are not only deposited on the substrate but are also undesirably deposited on other parts of the epi reactor. FIG. 1 is a schematic representation of an epi reactor 10 which illustrates the accumulation of undesirable deposits on a thermocouple sheath in accordance with the prior art.

As shown in FIG. 1, reactor 10 includes a quartz dome 12 which forms a reactor enclosure 14 with a reactor base section 16. Located within enclosure 14 are one or more substrates 18, typically monocrystalline silicon wafers, supported by a susceptor 20.

During processing, substrates 18 are heated typically with an external radiation source 22 such as tungsten halogen lamps, resistive heating elements and/or RF heaters. A reactive gas is introduced into enclosure 14 through one or more injector ports 24. The reactive gas typically includes trichlorosilane although other reactive gases besides trichlorosilane can be used depending upon the particular type of layer to be deposited. The reactive gas reacts with heated substrates 18 resulting in the deposition of layers on substrates 18 as those skilled in the art understand. The spent process gas may then be exhausted through a vacuum pump 17. Typically, vacuum pump 17 is also used to produce a subatmospheric pressure in enclosure 14 during processing. However, depending upon the particular process, enclosure 14 may be maintained at atmospheric pressure during processing.

Of importance, to insure uniformity of thickness and quality of the deposited layer, the temperature to which substrates 18 are heated during the epi process must be accurately measured and controlled.

To allow accurate measurement of the temperature of substrates 18, reactor 10 includes a thermocouple tip 26 located in a thermocouple sheath 28 and in enclosure 14. To prevent reactive gas from escaping, thermocouple sheath 28 forms a seal with port 30 of base section 16 using conventional techniques such as the use of an O-ring. The temperature measured by thermocouple tip 26 is displayed on a temperature readout unit 32 which is coupled to thermocouple tip 26 by leads 27. Thermocouple tip 26 is typically located near the sealed end of thermocouple sheath 28. See U.S. Pat. No. 5,710,407 issued to Moore et al, herein incorporated by reference in its entirety, which discusses temperature control in a reactor in more detail.

During the epi process, deposits 40, e.g. silicon, are inevitably formed on thermocouple sheath 28. Over time, deposits 40 flake and fall off of thermocouple sheath 28 thus introducing particulates 42 into enclosure 14. Particulates 42 can contaminate substrates 18 and cause defects in the layer deposited on substrates 18. High quality layers, such as those required for integrated circuits, must be free from these defects.

To reduce generation of particulates 42, conventional practice is to clean or replace thermocouple sheath 28 during periodic scheduled maintenance of reactor 10. However, during the time period between scheduled maintenance, substantial accumulation and flaking of deposits 40 and the associated contamination from particulates 42 occurs. Accordingly, the art needs a method for preventing particulate contamination from occurring between periodic scheduled maintenance.

SUMMARY OF THE INVENTION

In accordance with the present invention, a cover mounted about an article used in a substrate processing reactor is presented. The cover has an outer surface which has a greater adherence to deposits than the article. In one embodiment, the article is a quartz thermocouple sheath, and the outer surface of the cover includes silicon carbide which has a greater adherence to deposits than the quartz of the thermocouple sheath.

By having a greater adherence to deposits, the cover impedes and essentially eliminates deposit flaking. Thus, the cover avoids the particulate contamination associated with conventional quartz thermocouple sheaths. Decreasing or eliminating particulate contamination advantageously improves the yield.

Further, to the extent deposit accumulation does become significant on the cover, an etch process can be used to remove the deposits. For example, an etch process using hydrogen chloride (HCl) as the etch gas can be performed to remove deposits from the cover although other etch gases can be used depending upon the particular deposits to be removed. Alternatively, the cover is easily removed and replaced with a new clean cover. The removed cover can then be cleaned and saved for use at a later time while the reactor remains online processing substrates.

Preferably, the cover is formed of a material such as silicon carbide which has essentially no effect on the response time or the measured temperature compared to the use of a conventional quartz thermocouple sheath. As used herein, the response time is the time in which temperature changes in the reactor are measured by a thermocouple in the quartz thermocouple sheath. In this manner, the cover is thermally invisible and the thermocouple measures temperature the same as not having the cover in place.

In one embodiment, the cover includes first and second half sections and a slip ring. The cover is installed over the thermocouple sheath by placing the half sections around the thermocouple sheath and then sliding the slip ring into place around the half sections. Further, by forming the cover and thermocouple sheath with corresponding bends, such as 90° bends, the cover is prevented from slipping or moving relative to the thermocouple sheath. The cover is also easily removed from the thermocouple sheath by sliding the slip ring off and removing the half sections.

Also in accordance with the present invention, a thermocouple assembly is presented which includes a thermocouple sheath and a sheath cover, the sheath cover having an outer surface with a greater adherence to deposits than the sheath. In one embodiment, the sheath has a sealed end and a thermocouple tip is located within the sheath adjacent the sealed end.

These and other objects, features and advantages of the present invention will be more readily apparent from the detailed description set forth below taken in conjunction with the accompanying drawings.

BRIEF DESCRIPTION OF THE DRAWINGS

In the following description, similar elements are labeled with similar reference numbers.

DETAILED DESCRIPTION

Figure 2:
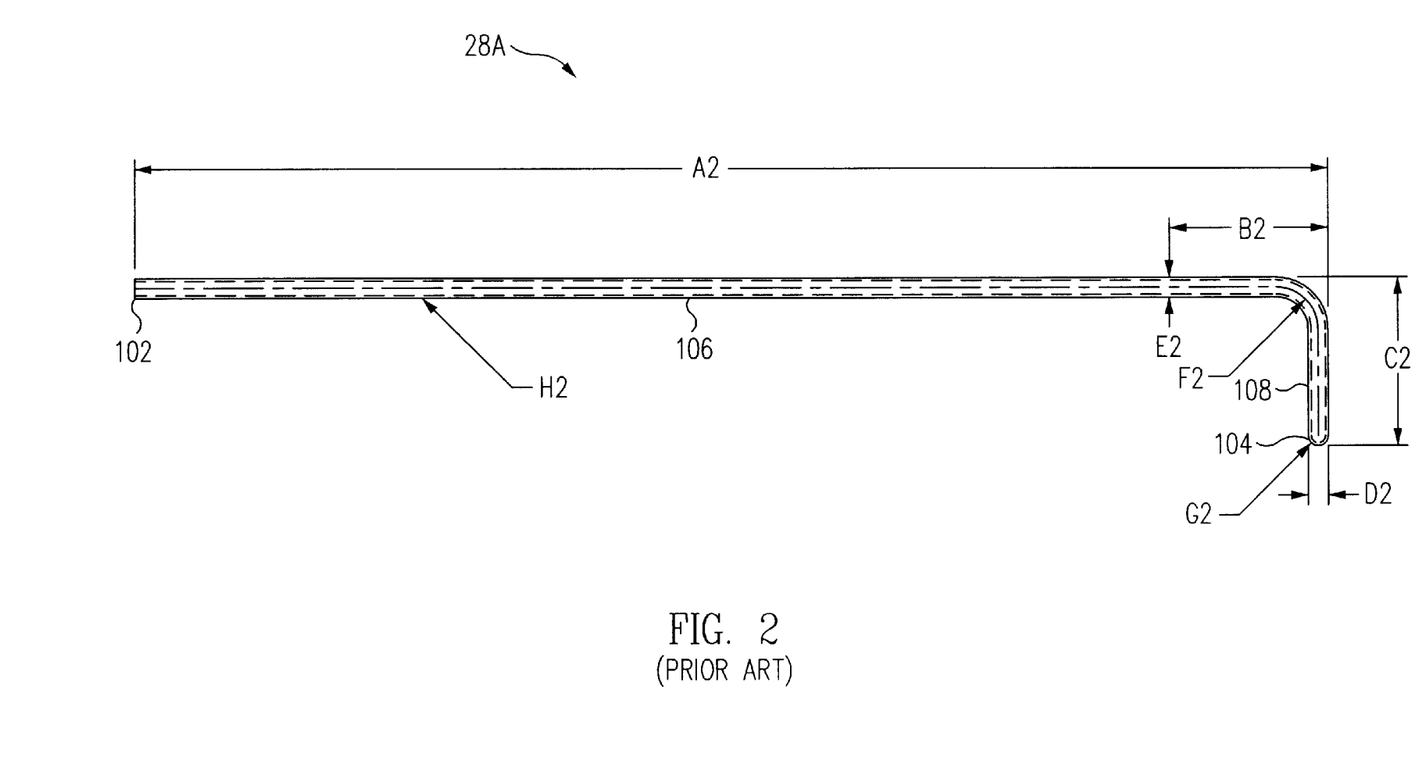
FIG. 2 is a side view of a conventional bent quartz thermocouple sheath for use with a thermocouple sheath covering in accordance with the present invention.

In accordance with the present invention, a thermocouple sheath cover suitable for use in a semiconductor processing reactor such as an epitaxial reactor is presented. FIG. 2 is a side view of a conventional bent quartz thermocouple sheath 28A for use with a sheath covering in accordance with the present invention. In this embodiment, thermocouple sheath 28A is GE 214 clear quartz manufactured using techniques well known to those skilled in the art although typically any material substantially transparent to infrared radiation (IR) can be used. More generally, for any particular heat source, thermocouple sheath 28A is formed from a material that does not adversely affect the temperature measurement and also does not adversely affect the performance of the reactor.

Thermocouple sheath 28A has an open end 102 and is hollow allowing a thermocouple such as thermocouple tip 26 of FIG. 1 to be inserted into thermocouple sheath 28A. Further, thermocouple sheath 28A has a sealed end 104 which is located inside of the reactor enclosure (e.g. see enclosure 14 of FIG. 1) during use. Typically, the thermocouple tip is placed inside of thermocouple sheath 28A at sealed end 104. By extending shaft 106 of thermocouple sheath 28A through a conventional port (e.g. see port 30 of FIG. 1), thermocouple sheath 28A can be used in a subatmospheric pressure reactor while allowing the inside of thermocouple sheath 28A to be at atmospheric pressure.

Thermocouple sheath 28A further includes a tip 108 bent at a 90° angle from shaft 106.

Illustrative specifications for the various characteristics of thermocouple sheath 28A shown in FIG. 2 are set forth below in Table 1.

TABLE 1

| CHARACTERISTIC | SPECIFICATION | UNIT |
| --- | --- | --- |
| A2 | 15.25 | Inches |
| B2 | 2.00* | Inches |
| C2 | 2.25 + 0.00 − 0.03 | Inches |
| D2 | 0.02 | Inches |
| E2 | ±0.02 | Inches |
| F2 | R.625 | Inches |
| G2 | Seal end & finish/grind to full radius | |
| H2 | 0.157 ID × 0.236 OD | Inches |

*Note: Perpendicularity call-out applies to the 2.00" dimension, not to the entire length of the part.

Figure 3:
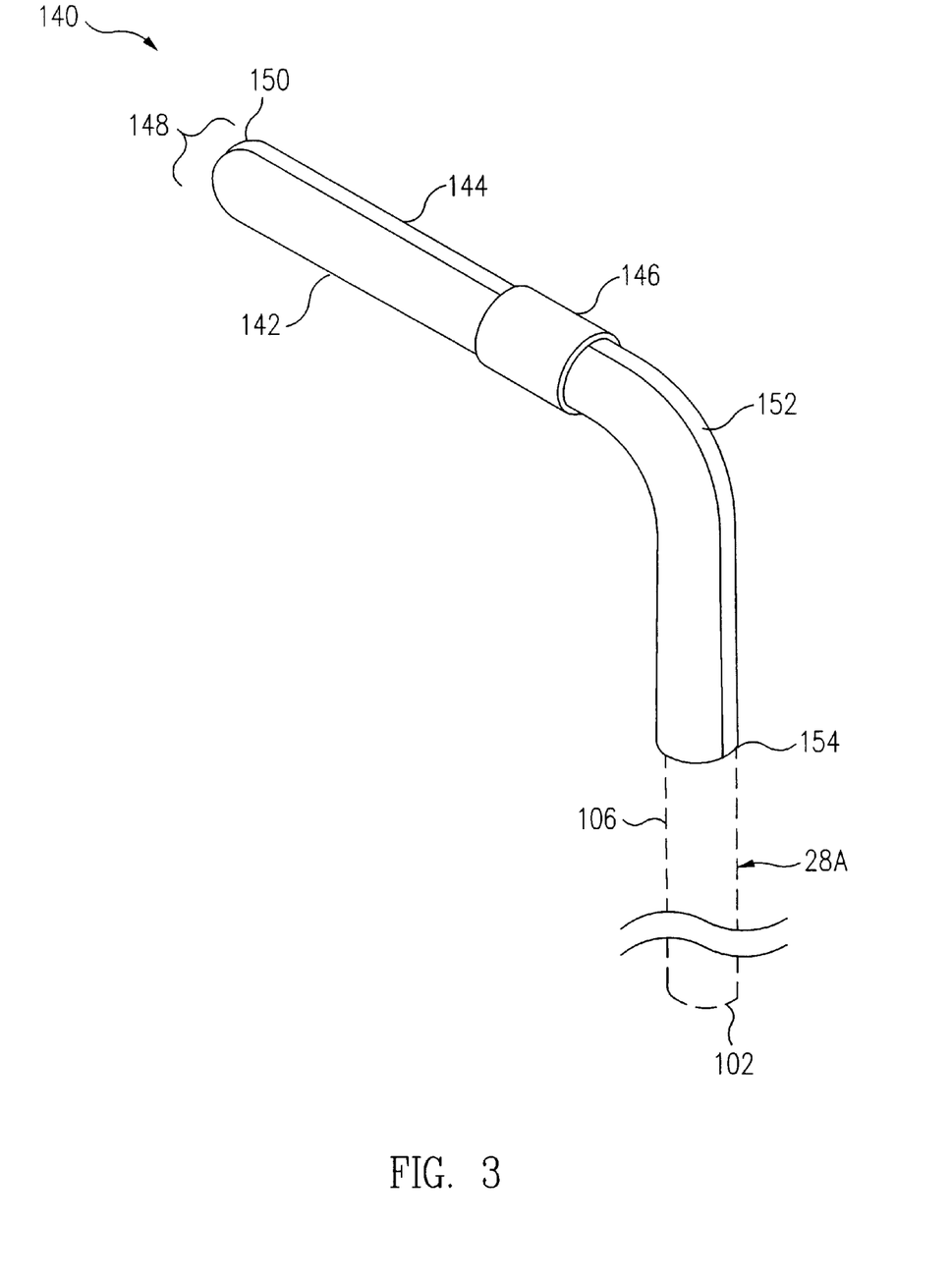
FIG. 3 is a perspective view of a thermocouple sheath cover in accordance with the present invention.

FIG. 3 is a perspective view of a thermocouple sheath cover 140 in accordance with the present invention. Cover 140 includes first and second half sections 142, 144 and a slip ring 146 which is a retainer that holds half sections 142, 144 together. Cover 140 is installed over tip 108 of thermocouple sheath 28A of FIG. 2 by placing half sections 142, 144 around tip 108 and then sliding slip ring 146 into place. Slip ring 146 is slid over half sections 142, 144 a distance sufficient to prevent slip ring 146 from adversely affecting the ability of the thermocouple tip to measure temperature. For example, slip ring 146 is slid over half sections 142, 144 to an elbow 152 of cover 140. As those skilled in the art understand, the thermocouple used (e.g. see thermocouple tip 26 of FIG. 1) with thermocouple sheath 28A and cover 140 is calibrated before use. For example, a thermocouple is calibrated during test runs of a reactor by correlating thermocouple measurements to temperature measurements of test substrates taken by another thermocouple that contacts the test substrates.

Cover 140 is also easily removed from thermocouple sheath 28A by sliding slip ring 146 off and removing half sections 142, 144.

When secured, cover 140 is mounted about thermocouple sheath 28A. In particular, cover 140 encloses sealed end 104, tip 108, and a portion of shaft 106 of thermocouple sheath 28A such that shaft 106 extends from cover 140 as indicated by the dashed lines shown in FIG. 3. By forming cover 140 with a 90° elbow 152 corresponding to the 90° bend in thermocouple sheath 28A, cover 140 is prevented from slipping or moving relative to thermocouple sheath 28A when secured.

While a 90° elbow 152 corresponding to the 90° bend in the thermocouple sheath 28A is described, it is understood that a 90° angle is only illustrative, and that other angles and/or no angles can also be used. In general, thermocouple sheath 28A and cover 140 can be formed in any one of a variety of corresponding shapes. For example, thermocouple sheath 28A and cover 140 can be straight, curved, hook shaped and/or can have two or more bends.

When secured, half sections 142, 144 are in abutting contact with one another and form an enclosure 148 which is in the shape of a sealed end cylindrical tube having a 90° bend (i.e. elbow 152). In particular, enclosure 148 has a rounded end 150 and an open end 154. Between rounded end 150 and elbow 152 and between open end 154 and elbow 152, enclosure 148 is cylindrical in shape. Slip ring 146 has an inner diameter greater than the outside combined diameter of half sections 142, 144 so that slip ring 146 can be slipped over half sections 142, 144. While this embodiment uses half sections 142, 144, in view of this disclosure those skilled in the art can implement cover 140 with any number of desired section, e.g. one, three, four or more sections. In addition, although slip ring 146 is set forth as the retainer which holds half sections 142, 144 together, it is understood that slip ring 146 is only illustrative and that other retainers and/or section designs can be used. For example, a tongue and groove structure at the edge of the sections or other means can be used to facilitate holding the sections together.

The entire outer surface of cover 140 includes a material which has an adherence to deposits greater than that of thermocouple sheath 28A. The particular deposits formed depend upon the particular process. Examples of deposits include doped or undoped monocrystalline or polycrystalline silicon, oxides such as silicon oxide, nitrides such as silicon nitride, metal suicides, and various metals such as tungsten.

In particular, half sections 142, 144 are formed of material which has a greater adherence to deposits formed thereon or, alternatively, include a coating of material which has a greater adherence to deposits formed thereon, than quartz. In this embodiment, half sections 142, 144 are formed of silicon carbide.

To manufacture half sections 142, 144 of silicon carbide, a part which has an inverse shape to the desired half section is first formed out of pure graphite using conventional techniques. The graphite part is then heated, e.g. by a furnace to over 2000° C. A silicon carbide film is then grown or deposited on the heated graphite part to the desired thickness. For example, the silicon carbide film is grown or deposited for a sufficient time to obtain the desired thickness. After cooling, the graphite part is then removed from the silicon carbide film, e.g. by machining or burning the graphite part away. The remaining silicon carbide film is then finished, e.g. by grinding and sanding the silicon carbide film to the proper dimensions. Half sections 142, 144 formed of silicon carbide can be obtained from Midland Materials of Midland, Mich.

Slip ring 146 is also formed of material which has a greater adherence to deposits formed thereon or, alternatively, includes a coating of material which has a greater adherence to deposits formed thereon, than quartz. In this embodiment, slip ring 146 is graphite with a silicon carbide coating on the exposed surfaces. Slip ring 146 can be manufactured using the process described in relation to half section 142, 144 except that the graphite part is not removed from the silicon carbide film. Slip ring 146 formed of graphite with a silicon carbide coating can also be obtained from Midland Materials of Midland, Mich.

By forming half sections 142, 144 of silicon carbide and forming slip ring 146 with an outer coating of silicon carbide, it has been found that deposits which typically flake or fall off of conventional quartz thermocouple sheaths do not flake or fall off of cover 140. By impeding and essentially eliminating deposit flaking, the associated particulate contamination is also avoided. Accordingly, cover 140 improves yield from a reactor in which cover 140 is used compared to the use of conventional uncovered quartz thermocouple sheaths.

Further, to the extent deposit accumulation on cover 140 becomes significant, an etch process can be used to remove the deposits. For example, an etch process using hydrogen chloride (HCl) as the etch gas can be performed to remove deposits from cover 140 although other etch gases can be used depending upon the particular deposits to be removed. Alternatively, cover 140 is easily removed and replaced with a new clean cover 140. The removed cover 140 can then be cleaned and saved for use at a later time while the reactor remains online processing substrates.

Generally, cover 140 is formed of a material which allows accurate temperature measurement and provides a desired response time, where the response time is the time in which temperature changes in the reactor are measured by the thermocouple in the quartz thermocouple sheath. For example, a cover 140 formed entirely of graphite substantially increases the response time which may be unacceptable depending upon the particular application.

More preferably, cover 140 is formed of a material such as silicon carbide which has essentially no affect on the response time or the measured temperature compared to the use of a conventional uncovered quartz thermocouple sheath. In this manner, cover 140 is thermally invisible and the thermocouple measures temperature the same as not having cover 140 in place.

Figure 4:
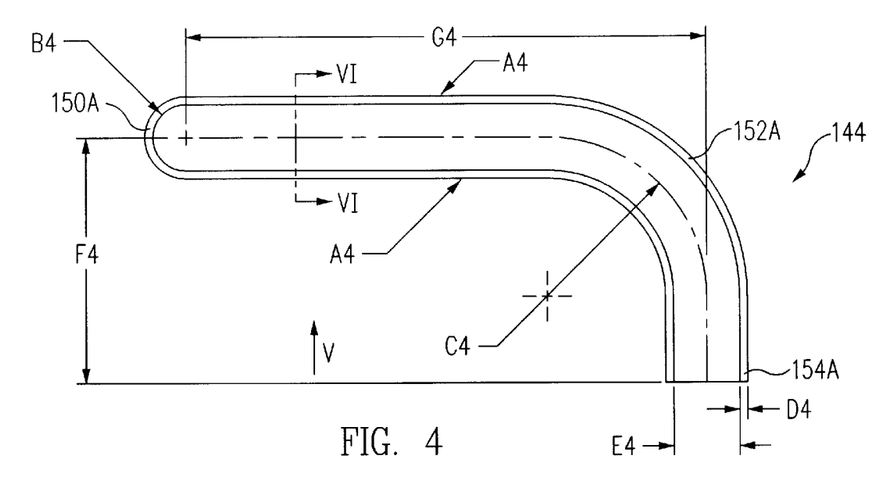
FIG. 4 is a front perspective view of a half section of the thermocouple sheath cover in accordance with the present invention.

FIG. 4 is a front perspective view of half section 144 of cover 140 in accordance with the present invention. As shown in FIG. 4, half section 144 is in the shape of a half cylinder having a rounded end 150A, an open end 154A, and an elbow 152A between rounded end 150A and open end 154A. Illustrative specifications for the various characteristics of half section 144 shown in FIG. 4 are set forth below in Table 2.

TABLE 2

| CHARACTERISTIC | SPECIFICATION | UNIT |
|---|---|---|
| A4 | Break and Deburr all sharp edges | |
| B4 | FULL R | |
| C4 | R.625 FULL 90° | Inches |
| D4 | 0.030 TYPICAL | Inches |
| E4 | 0.280 TYPICAL 0.270 TYPICAL | Inches |
| F4 | 1.00 | Inches |
| G4 | 2.05 | Inches |

Figure 5:
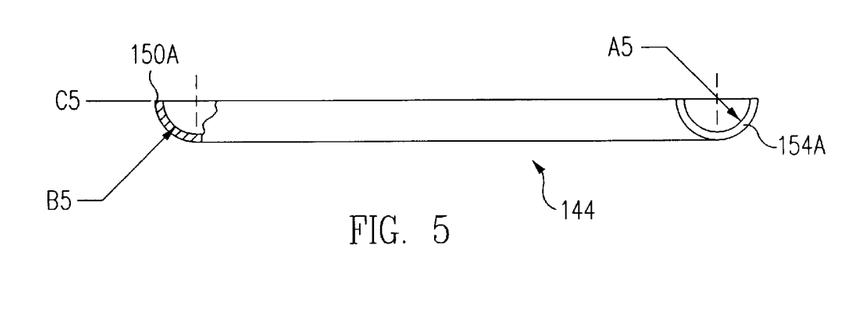
FIG. 5 is a side view, partially cutaway, taken along the line V of FIG. 4 of the half section of the thermocouple sheath cover.

FIG. 5 is a side view, partially cutaway, taken along the line V of FIG. 4 of half section 144. Illustrative specifications for the various characteristics of half section 144 shown in FIG. 5 are set forth below in Table 3.

TABLE 3

| CHARACTERISTIC | SPECIFICATION | UNIT |
|---|---|---|
| A5 | FULL R TYPICAL | Inches |
| B5 | R.138 | Inches |
| C5 | 0.0005 | Inches |

Figure 6:
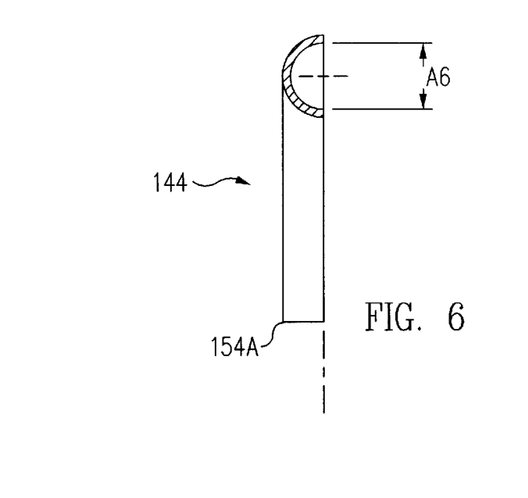
FIG. 6 is a cross-sectional view taken along the line VI—VI of FIG. 4 of the half section of the thermocouple sheath cover.

FIG. 6 is a cross-sectional view taken along the line VI—VI of FIG. 4 of half section 144. An illustrative specification for the various characteristics of half section 144 shown in FIG. 6 is set forth below in Table 4.

TABLE 4

| CHARACTERISTIC | SPECIFICATION | UNIT |
|---|---|---|
| A6 | ⊥ 0.02* | Inches |

*Note: Value is perpendicularity tolerance.

Figure 7:
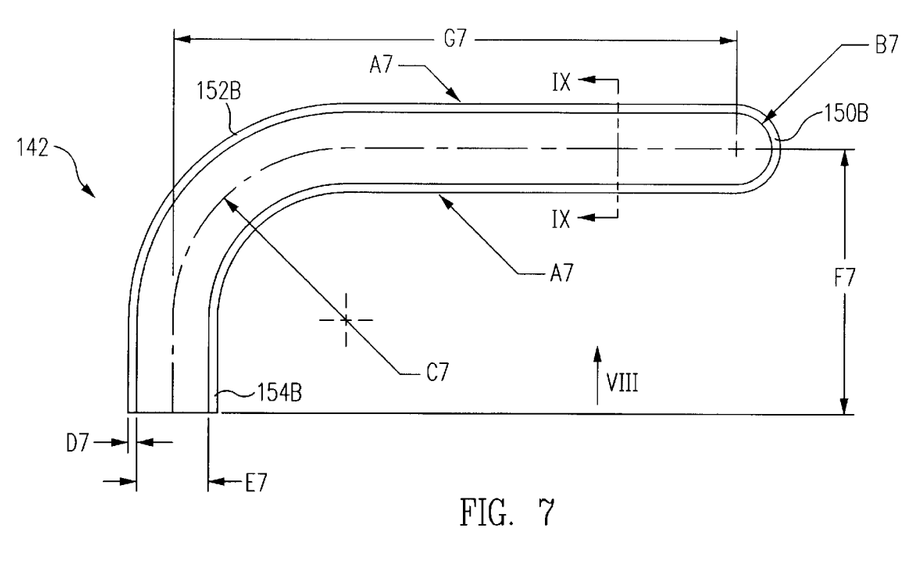
FIG. 7 is a front perspective view of a half section of the thermocouple sheath cover in accordance with the present invention.

FIG. 7 is a front perspective view of half section 142 of cover 140 in accordance with the present invention. As shown in FIG. 7, half section 142 is a mirror image of half section 144. In particular, half section 142 is in the shape of a half cylinder having a rounded end 150B, an open end 154B, and an elbow 152B between rounded end 150B and open end 154B. Illustrative specifications for the various characteristics of half section 142 shown in FIG. 7 are set forth below in Table 5.

TABLE 5

| CHARACTERISTIC | SPECIFICATION | UNIT |
|---|---|---|
| A7 | Break and Deburr all sharp edges | |
| B7 | FULL R | |
| C7 | R.625 FULL 90° | Inches |
| D7 | 0.030 TYPICAL | Inches |
| E7 | 0.280 TYPICAL 0.270 TYPICAL | Inches |
| F7 | 1.00 | Inches |
| G7 | 2.05 | Inches |

Figure 8:
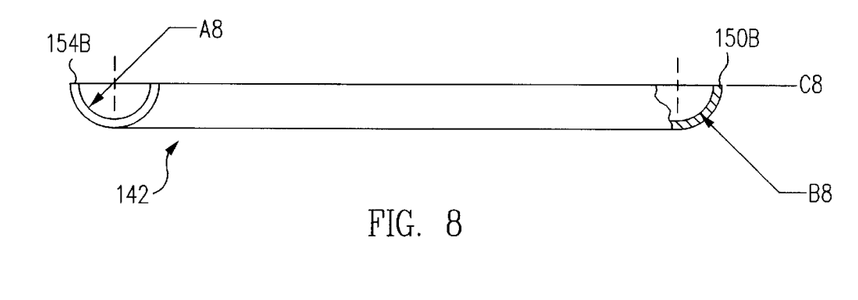
FIG. 8 is a side view, partially cutaway, taken along the line VIII of FIG. 7 of the half section of the thermocouple sheath cover.

FIG. 8 is a side view, partially cutaway, taken along the line VIII of FIG. 7 of half section 142. Illustrative specifications for the various characteristics of half section 142 shown in FIG. 8 are set forth below in Table 6.

TABLE 6

| CHARACTERISTIC | SPECIFICATION | UNIT |
|---|---|---|
| A8 | FULL R TYPICAL | Inches |
| B8 | R.138 | Inches |
| C8 | 0.0005 | Inches |

Figure 9:
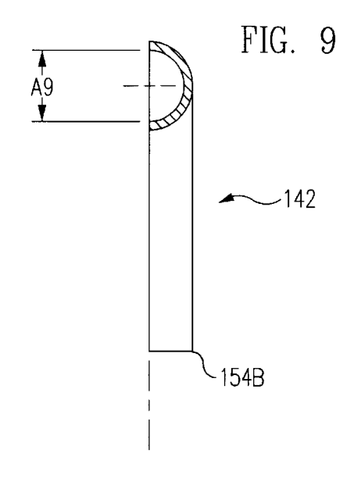
FIG. 9 is a cross-sectional view taken along the line IX—IX of FIG. 7 of the half section of the thermocouple sheath cover.

FIG. 9 is a cross-sectional view taken along the line IX—IX of FIG. 7 of half section 142. An illustrative specification for the various characteristics of half section 142 shown in FIG. 9 is set forth below in Table 7.

TABLE 7

| CHARACTERISTIC | SPECIFICATION | UNIT |
|---|---|---|
| A9 | ⊥ 0.02* | Inches |

*Note: Value is perpendicularity tolerance.

Figure 10:
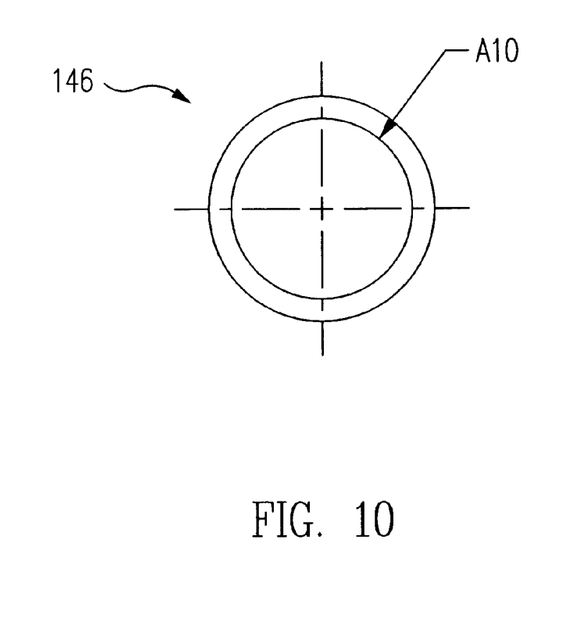
FIG. 10 is a frontal view of a slip ring of the thermocouple sheath cover in accordance with the present invention.

FIG. 10 is a frontal view of slip ring 146 of cover 140 in accordance with the present invention. An illustrative specification for the various characteristics of slip ring 146 shown in FIG. 10 is set forth below in Table 8.

TABLE 8

| CHARACTERISTIC | SPECIFICATION | UNIT |
|---|---|---|
| A10 | 0.360 THRU* | Inches |

*Note: 0.360 dimension is for reference only. The outside combined diameter of half sections 142, 144 may require this dimension to be adjusted so that slip ring 146 can be slipped over half sections 142, 144, holding half sections 142, 144 together.

Figure 11:
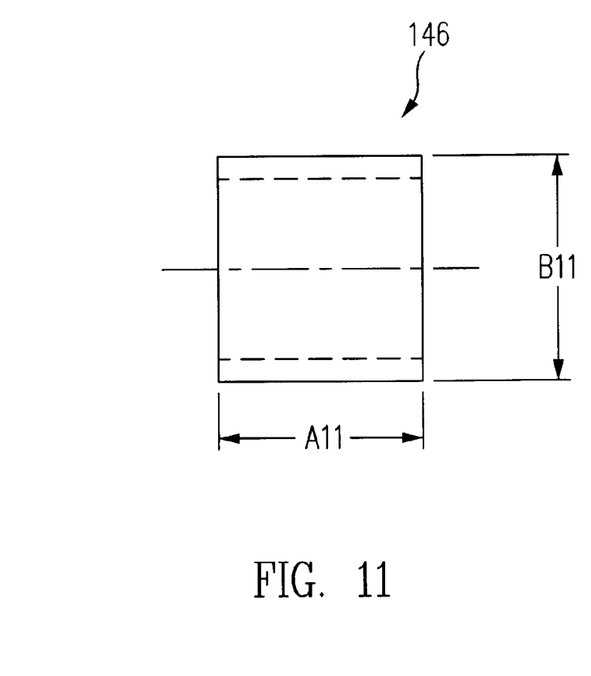
FIG. 11 is a side view of the slip ring of the thermocouple sheath cover in accordance with the present invention.

FIG. 11 is a side view of slip ring 146 of cover 140 in accordance with the present invention. Illustrative specifications for the various characteristics of slip ring 146 shown in FIG. 11 are set forth below in Table 9.

TABLE 9

| CHARACTERISTIC | SPECIFICATION | UNIT |
|---|---|---|
| A11 | 0.38 | Inches |
| B11 | 0.44 | Inches |

*Note: Dimensions are after silicon carbide coating.

The drawings and the forgoing description gave examples of the present invention. The scope of the present invention, however, is by no means limited by these specific examples. Numerous variations, whether explicitly given in the specification, such as differences in structure, dimension, and use of material, are possible. For example, although a particular epi reactor and epi process are set forth, it is understood that other reactor and/or processes can be used. The scope of the invention is at least as broad as given by the following claims.

We claim:

1. A structure comprising:
    a cover having a n outer surface, said cover mounted about an article used in a substrate processing reactor, wherein said outer surface has a greater adherence to deposits than said article,
    wherein said cover further comprises:
        a first section;
        a second section, wherein said first section and said second section enclose at least a portion of said article; and
        a retainer, wherein said retainer holds said first section and said second section in place.

2. The structure of claim 1 wherein said first section is a mirror image of said second section.

3. The structure of claim 1 wherein said first section and said second section are in abutting contact, said first section and said second section forming an enclosure.

4. The structure of claim 3 wherein said retainer is a slip ring which holds said first section and said second section together.

5. The structure of claim 4 wherein said slip ring has an inner diameter greater than an outside combined diameter of said first section and said second section.

6. The structure of claim 3 wherein said article is a quartz sheath, said quartz sheath having a tip contained in said enclosure.

7. The structure of claim 3 wherein said enclosure is in the shape of a cylindrical tube having a sealed end.

8. The structure of claim 7 wherein said cylindrical tube has a single bend.

9. The structure of claim 8 wherein said single bend prevents said cover from moving relative to said article.

10. The structure of claim 7 wherein said cylindrical tube has a plurality of bends.

11. The structure of claim 3 wherein said enclosure comprises:
    a rounded end; and
    an open end.

12. The structure of claim 11 wherein said enclosure further comprises an elbow, said enclosure being cylindrical between said rounded end and said elbow and between said open end and said elbow.

13. The structure of claim 1 wherein said outer surface comprises a material which has a greater adherence to deposits than quartz.

14. The structure of claim 13 wherein said outer surface comprises silicon carbide.

15. The structure of claim 13 wherein said outer surface consists of silicon carbide.

16. The structure of claim 1 wherein outer surfaces of said first section, said second section and said retainer comprise silicon carbide.

17. The structure of claim 16 wherein said first section and said second section consist of silicon carbide.

18. The structure of claim 16 wherein said retainer is a slip ring comprising graphite with a silicon carbide coating.

19. The structure of claim 1 wherein said cover is thermally invisible.

20. The structure of claim 1 wherein said cover has essentially no affect on the ability of a thermocouple located in said article to measure temperature.

21. The structure of claim 1 wherein said article is a thermocouple sheath.

22. The structure of claim 21 wherein said thermocouple sheath comprises quartz and wherein said outer surface comprises silicon carbide.

23. The structure of claim 21 wherein said thermocouple sheath has a sealed end, said structure further comprising a thermocouple located within said thermocouple sheath adjacent said sealed end.

24. The structure of claim 1 wherein said outer surface has a first adherence to said deposits and wherein said article has a second adherence to said deposits, said first adherence being greater than said second adherence.

25. A method of adhering deposits about an article comprising:

positioning said article in a substrate processing reactor;

covering said article with a cover comprising an outer surface having a greater adherence to deposits than said article, wherein said cover comprises:

a first section;

a second section; and a retainer, said covering comprising:

placing said first section and said second section around said article; and placing said retainer around said first section and said second section.

26. The method of claim 25 further comprising manufacturing said cover, said manufacturing comprising:

forming a graphite part;

forming a silicon carbide film on said graphite part; and removing said graphite part from said silicon carbide.

27. A method of adhering deposits about an article comprising:

positioning said article in a substrate processing reactor;

covering said article with a cover comprising an outer surface having a greater adherence to deposits than said article, wherein said article and said cover have corresponding bends, said corresponding bends preventing said cover from moving relative to said article.

28. The method of claim 27 further comprising manufacturing said cover, said manufacturing comprising:

forming a graphite part;

forming a silicon carbide film on said graphite part; and removing said graphite part from said silicon carbide.

* * * * *